UNITED STATES PATENT OFFICE.

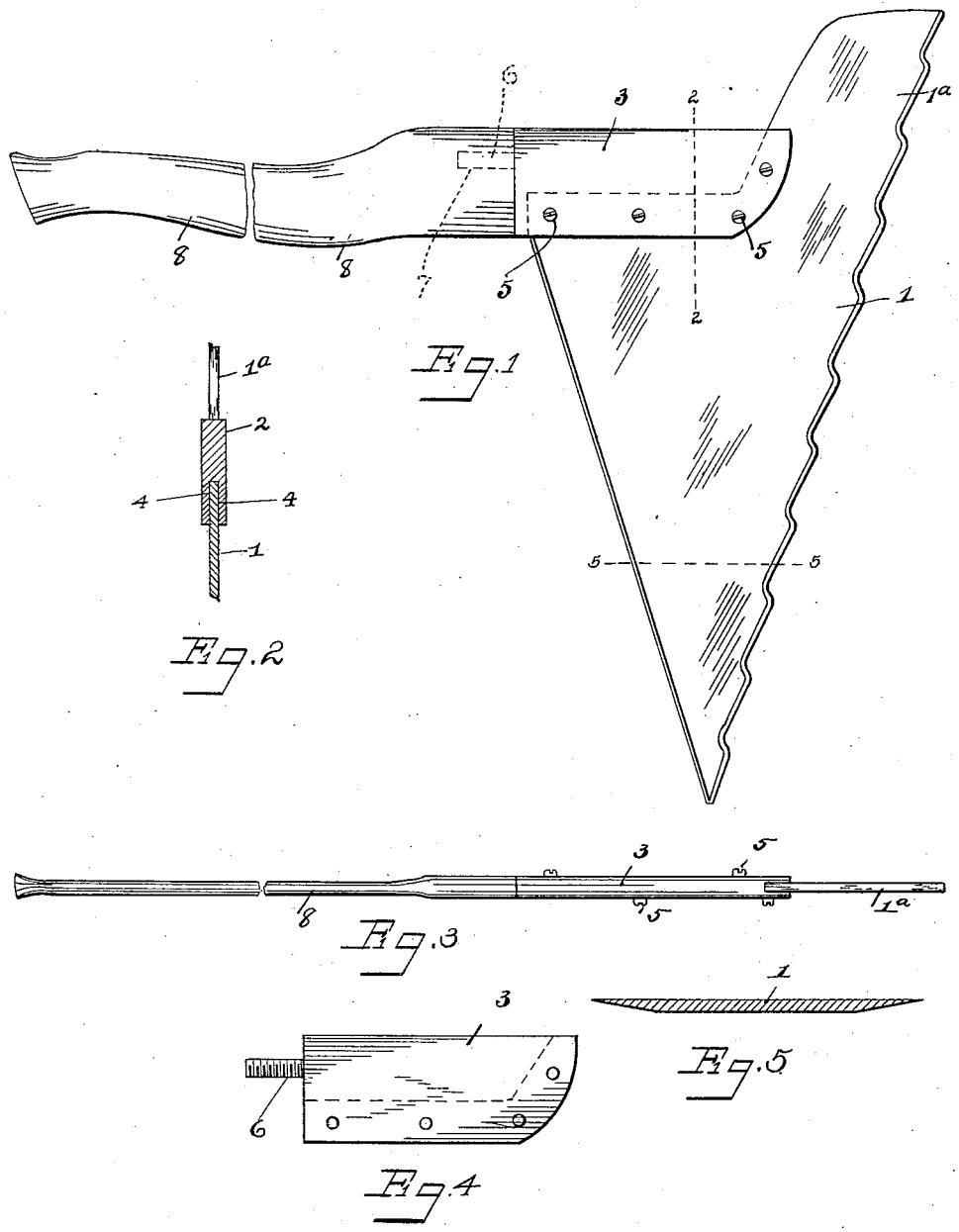

JOHN S. STEEL, OF CHILLICOTHE, OHIO.

HAY-CUTTER.

1,033,485.  Specification of Letters Patent.  Patented July 23, 1912.

Application filed March 4, 1911. Serial No. 612,325.

*To all whom it may concern:*

Be it known that I, JOHN S. STEEL, a citizen of the United States, residing at Chillicothe, in the county of Ross and State of Ohio, have invented certain new and useful Improvements in Hay-Cutters, of which the following is a specification.

My invention relates to the improvement of hay cutters.

The objects of my invention are to provide a hand operated tool by means of which hay and straw, whether in the form of stacks or bales or other compact body, may be readily and effectively severed; to so construct my improved cutting device as to permit of the cutting blade entering the body of hay or straw without undesirable resistance and to produce a simultaneous operation at both the front and rear edges of the cutting blade; to provide improved means for detachably connecting the handle with the cutting blade and to produce other improvements the details of which will be more fully pointed out hereinafter. These objects I accomplish in the manner illustrated in the accompanying drawings, in which—

Figure 1 is a side elevation of my improved cutting device, a portion of the handle thereof being broken away for the sake of clearness in illustration, Fig. 2 is a detail sectional view on line 2—2 of Fig. 1, Fig. 3 is a plan view, Fig. 4 is a side elevation of the handle attaching shoe, and, Fig. 5 is an enlarged transverse section on line 5—5 of Fig. 1.

Similar numerals refer to similar parts throughout the several views.

In carrying out my invention, I employ a substantially triangular cutting blade 1 of suitable metal, the upper and wider end portion of which is provided on its forward side with an upward extension 1ª. This cutting blade 1 has its forward and longer edge preferably serrated or formed with elongated scallops, said edge being sharpened preferably by beveling the marginal portion of the body on one side, as shown more clearly in Fig. 5. The rear and shorter edge of the blade is likewise beveled or sharpened as clearly indicated, this rear edge, however, being preferably straight as shown.

3 represents a horizontal handle attaching shoe, the underside and forward end of which are channeled as indicated at 4, the underside channel being adapted, as shown, to receive the upper horizontal top portion of the cutting blade 1 and the end channel being adapted as indicated more clearly in dotted lines in Fig. 1 to receive the lower and rear portion of the blade extension 1ª. The shoe may be fastened in its connection with the blade through the medium of suitable screws, rivets, bolts or other attaching devices such as are indicated at 5. The outer or rear end of the shoe 3 is provided with a rearwardly extending attaching pin or screw 6, with which are adapted to engage the internal threads of a socket 7 formed in one end of a suitable handle 8.

It will readily be understood that in utilizing my device for the purpose of severing bodies of hay and straw, the implement is wielded or operated somewhat after the manner of using an ax, except that the blade is swung vertically downward. In this operation, it will be understood that the point or lower end of the blade will enter the body of hay or straw without undesirable resistance and that the cut formed must gradually increase as the triangular blade sinks into the material. It will also be understood that the severing action will be facilitated by the employment of the serrated or scalloped forward edge of the blade and that by the use of the device, compact bodies of hay, straw and similar material may be rapidly and effectively severed.

While I have herein shown and described one particular embodiment of my invention, I wish it to be understood that I do not limit myself to all the precise details of construction herein set forth, as modification and variation may be made without departing from the spirit of the invention or exceeding the scope of the appended claims.

What I claim, is—

1. A hand hay cutter comprising a handle, and a triangular blade carried upon the end of said handle and extending at right angles from one side thereof, and an integral extension extending upon the opposite side of said blade and forming a portion of the cutting edge of said blade.

2. A hand hay cutter comprising a double-edged blade of substantially triangular form, an extension integrally formed upon the forward edge of said blade and terminating rear of the short edge thereof, a handle extending at right angles to said blade and straddling the top of the body of said blade and the rear edge of said extension, said extension being disposed upon the opposite side of said handle to the body of said blade.

In testimony whereof I affix my signature in presence of two witnesses.

JOHN S. STEEL.

Witnesses:
J. D. WITHGOTT,
CORA MABURY.

Copies of this patent may be obtained for five cents each, by addressing the "Commissioner of Patents, Washington, D. C."